Figure 1:
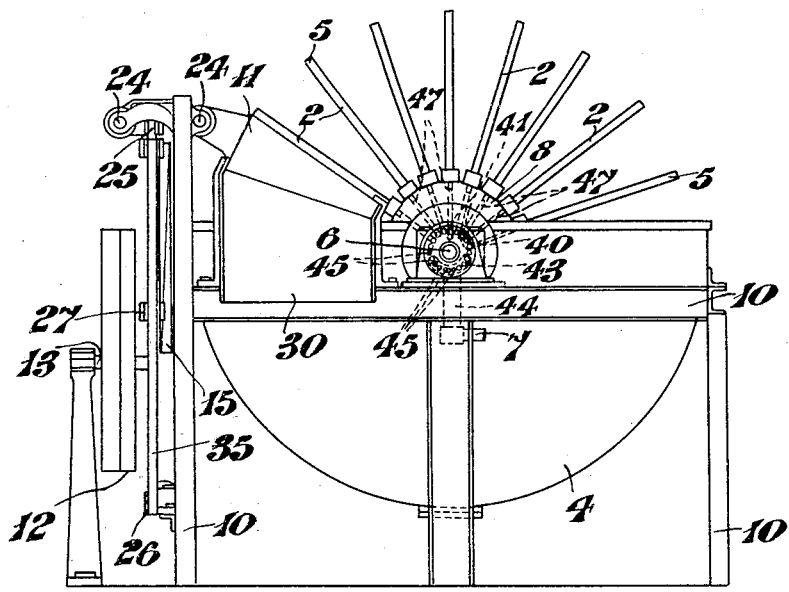

April 17, 1928. 1,666,381
H. S. HELE-SHAW ET AL
ROTARY FILTER
Filed Nov. 30, 1925 2 Sheets-Sheet 2

Inventors
Henry Selby Hele-Shaw
Reginald Colles Beaufoy Stillman
Joseph Allen Pickard
By Brown, Boettcher & Dienner
Attorneys Patented Apr. 17, 1928.

1,666,381

UNITED STATES PATENT OFFICE.

HENRY SELBY HELE-SHAW, REGINALD COLLES BEAUFOY STILLMAN, AND JOSEPH ALLAN PICKARD, OF LONDON, ENGLAND.

ROTARY FILTER.

Application filed November 30, 1925, Serial No. 72,109, and in Great Britain December 19, 1924.

This invention relates to rotary filters and has for its object to provide a rotary filter giving a maximum rate of filtration, and also to provide an efficient device whereby the material accumulating on radial or tangentially arranged filtering surfaces can be removed automatically.

Rotary filters have been designed in which the filtering surfaces have been of cylindrical form, the axis of the cylinder coinciding with the axis of rotation about which the whole filter revolves. Other filters have been designed in which the filtering surfaces are in planes at right angles to the axis of rotation; that is to say, filtering surfaces form the whole or part of a flat disc revolving in a plane normal to the axis of rotation. In either of the foregoing rotary filters matter can be removed from the filter by fixed adjustable scrapers or brushes.

The present invention comprises a rotary filter consisting of a series of filter units carried by a member rotatable on a horizontal axis and having filtering surfaces arranged radially to the axis or tangentially to a cylinder therein, and also having one or more interior filtrate passages extending through the units connected to an outlet, the carrier being rotatable in a vessel containing the fluid under treatment.

The fluid under treatment may be maintained at such a height in the vessel that during the rotation of the filter units around the horizontal axis the filtering surfaces thereof will be carried through the fluid and then through the space above it so that they will be alternately submerged and exposed.

The filter may be provided with movable scrapers or cleaning devices mounted on mechanism whereby they can be moved across the filtering surfaces in such a manner as to remove the material accumulating thereon. The mechanism for moving the scrapers may be designed to move them radially to or from the axis or to and fro longitudinally parallel to the axis, the filter unit carrying member being preferably rotated intermittently and the scraper operated during the pauses in such intermittent rotation.

The filter itself may be either of the vacuum or pressure type, and the filter units may each consist of filtering surfaces of any suitable material supported in a framing secured radially or tangentially to the rotary shaft or drum and enclosing a space or passage communicating with the filtrate outlet, or the filter units may be edge filtration units consisting of packs or piles of sheets of suitable material having a series of coincident perforations in communication with the filtrate outlet.

Figures 4, 5:
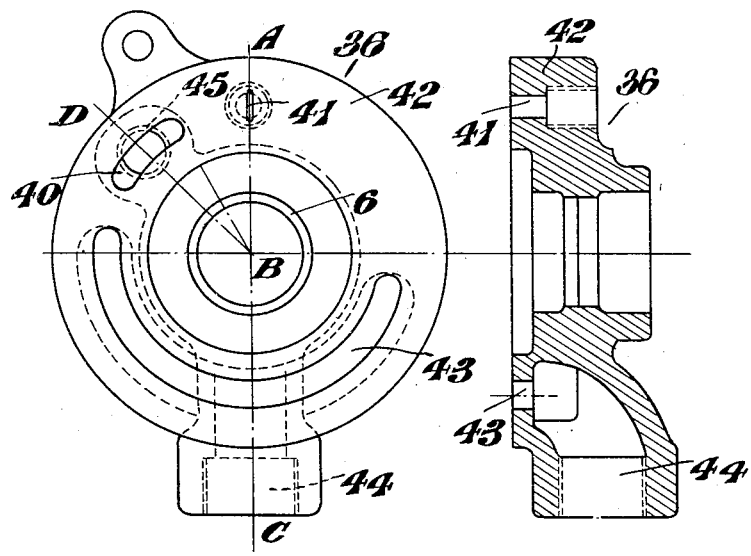
Figure 2:
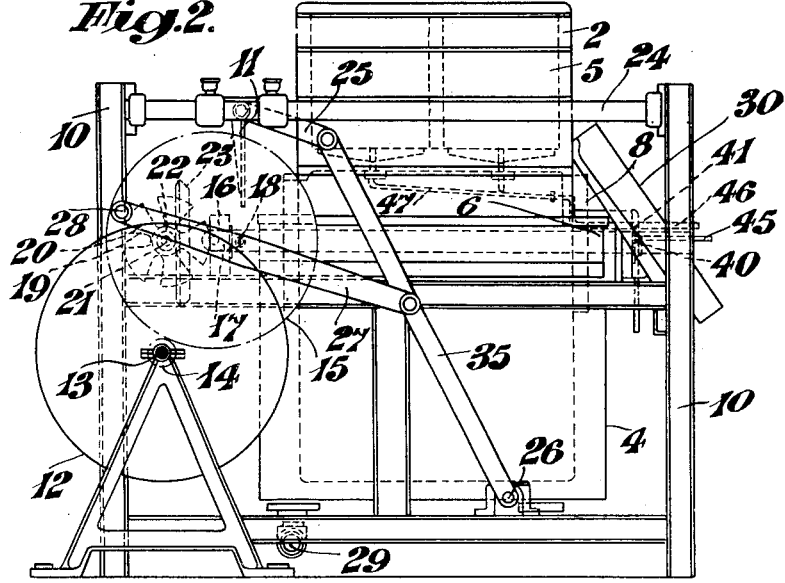
Figure 3:
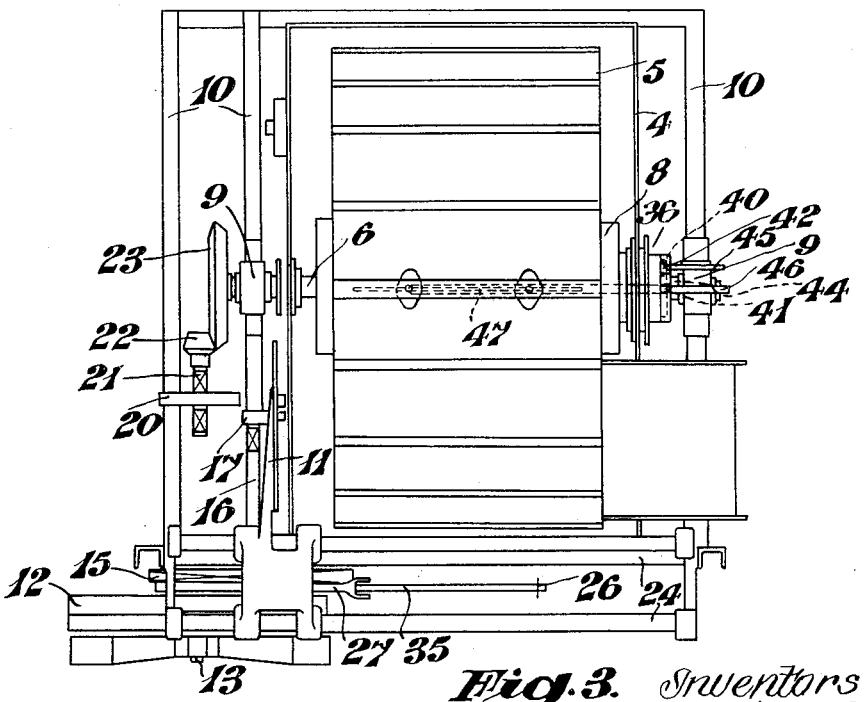

The accompanying drawings illustrate a manner of carrying out the invention. Figure 1 is an end elevation Figure 2 a side elevation and Figure 3 a plan of a rotary filter while Figure 4 is an elevation and Figure 5 a sectional side view of the valve of the filter. These drawings are not complete, portions being omitted to render them more easily understood, they however give sufficient detail to illustrate the invention fully.

In these drawings 4 is a casing for containing the fluid to be filtered and this casing is provided with a filling inlet connection 29. In the fluid in the casing 4 rotate a series of filter units 5 mounted radially on a drum or spider 8 rotated by a shaft 6 mounted in bearings 9 on a framework or standard 10. Each of the units 5 has two oppositely disposed parallel filtering surfaces 2 between which are arranged passages leading into the drum 8 the inside of which is connected in any suitable manner to a filtrate discharge outlet 7.

In the example illustrated the surfaces 2 of the flat filter units 5 are cleaned by longitudinally traversing scrapers 11 which are wedge-shaped as shown in Figure 1 so as to operate on the surfaces of two adjacent units simultaneously.

The drum 8 carrying the filter units 5 is driven from a power pulley 12 receiving power from any suitable source. The pulley 12 is mounted on a shaft 13 on which is also mounted a spur wheel 14 gearing with a spur wheel 15 mounted on a shaft 16 on which is fixed an arm 17 carrying at its outer end a roller 18 shown in dotted lines in Figure 2. The roller 18 at each revolution of the shaft 16 enters one of the series of radial slots 19 in a Geneva motion disc 20 mounted on a shaft 21 which also carries a mitre pinion 22 gearing with a mitre wheel 23 on the drum rotating shaft 6. By means of the Geneva motion the drum 8 carrying the filter units 5 is rotated intermittently, that is during the periods that the scraper 11 is out of action at a position beyond the path of the filter units, such rotation being effected by the roller 18 carried by the arm 17 on the continuously rotated shaft 16 operating in one of the slots 19 in the Geneva motion disc 20. During the period that the arm 17 is moving away from the Geneva disc 20 to bring the roller 8 into a position ready to enter the next slot 19 in the disc 20, the scraper 11 is traversed to and fro along guides 24 by means of a link 25 connected to the end of a lever 35 rocking about a shaft 26 by means of a link 27 connected to a crank pin 28 on the spur wheel 15.

During the movement of the scraper 11 towards the right the material accumulated on the filtering surfaces 2 of the filter units 5 is carried off such surfaces and discharged down a chute 30.

A control valve 36 is provided for connecting the units 5 in sequence during the rotation of the filter to a vacuum producing device and filter through the port 43 and discharge outlet 44 leading to the discharge pipe 7, then to a supply of washing water by means of a port 40 and outlet 45 and spraying apparatus arranged to spray the surface of the filter, and then by means of a port 41 to a pipe 46 connected to a supply of compressed air to loosen the cake of separated material accumulating on the filter.

The ports are so disposed that each in turn registers with one or more of the ports 45 arranged circumferentially in the face of the rotary drum 8 and connected by passages or pipes 47 to the inside channel of the filter units, these ports and passages being so disposed that the filtrate will be drawn through each filter unit during the period of its rotation in which it is immersed.

The peculiar paddle wheel like manner in which the flat filter units 5 are disposed on the drum 8 enables a large number of filtering surfaces to be employed in one machine.

During the rotation of the units 5 above the fluid in the casing 4, each unit is subjected to a drying process by maintenance of the vacuum for a time. The drying of the separated matter on the surfaces 2 in this type of filter is particularly effective when the units are of the edge filtration type by reason of the substantial support of the filtering medium preserving the form of the cake and preventing cracks from developing therein.

A further advantage of having the filtering units arranged radially or tangentially in accordance with the present invention is that when, as is usually the case, the fluid to be filtered has a tendency to settle, this settlement is prevented by the stirring action due to the rotation of the units paddle-wheel like in the fluid, so that special agitating devices as generally used in filters are avoided.

The scrapers 11 may be provided with or substituted by brushes, and instead of moving longitudinally or parallel to the axis of the filter, they may be provided with mechanism whereby they can be moved to and fro radially or transversely of the surface.

Various means can be arranged for cleaning the scraping blades or brushes after each operation.

The filter may be modified for use as one of the pressure type by enclosing the rotary element and the fluid receptacle in a tight casing in which an air pressure is maintained.

What we claim and desire to secure by Letter Patent is:—

1. In combination, a container for a body of fluid to be filtered, a rotatable filter operable therein, said filter comprising filter units disposed radially to and longitudinally of the axis of rotation of the filter and movable into and out of the body of fluid, and means operable over the surfaces of said filter units for removing accumulated material therefrom.

2. In combination, a rotary filter having a filter unit disposed radially to the axis of rotation of the filter, and means movable over the filtering surface of said unit longitudinally of the axis of rotation of the filter for removing accumulated material therefrom.

3. In combination, a rotatable filter, means for intermittently operating said filter, means for removing accumulated material from the filter, and means for operating said last means between the intermittent operations of the filter.

4. In a rotary filter, the combination of a pair of filter surfaces disposed radially to and longitudinally of the axis of rotation of the filter, and means operable simultaneously on both surfaces for removing accumulated material therefrom.

5. In combination, a rotatable filter, means for intermittently operating said filter, means for removing accumulated material from the filter, said means comprising guide means and a cleaning member slidably mounted thereon and cooperable with the filter, a source of power for the filter, and means connecting said cleaning member with said source of power and operable to reciprocate said cleaning member between the intermittent operations of the filter.

6. In combination, a rotatable filter, a Geneva motion mechanism operatively connected to intermittently turn said filter, and means for driving said Geneva mechanism.

7. In combination, a rotatable filter, a Geneva motion mechanism operatively connected to intermittently turn said filter, means for driving said mechanism and means operated by said driving means for cleaning the filter.

8. A rotary filter comprising a rotatable axial carrier, a filter unit disposed radially and longitudinally of said carrier and rotatable therewith, a cleaning member movable over the surface of the filter unit and into and out of the path of rotation thereof and means for rotating the filter during the periods that the cleaning member is out of the path of rotation of the filter unit.

9. A rotary filter comprising a rotatable axial carrier, a filter unit disposed radially and longitudinally of said carrier and rotatable therewith, means for intermittently turning the filter and a cleaning member movable over the surface of the filter unit between the intermittent turns of the filter.

10. A rotary filter comprising a rotatable axial carrier, filter units extending radially from and disposed longitudinally with respect to said carrier and rotatable therewith, said carrier being rotatable in a vessel containing the fluid under treatment, said filter units having interior filtrate passages and said units passing into and out of the fluid during rotation of the carrier, a centrally disposed valve, means for withdrawing the filtrate through said valve and a cleaning device mounted for movement over the filtering surfaces to remove accumulated material therefrom.

11. A rotary filter comprising a rotatable axial carrier, filter units extending radially from and disposed longitudinally with respect to said carrier and rotatable therewith, said carrier being rotatable in a vessel containing the fluid under treatment, said filter units having interior filtrate passages, said units passing into and out of the fluid during rotation of the carrier, a centrally disposed valve, means for withdrawing the filtrate through said valve, a cleaning device mounted for movement over the filtering surfaces to remove accumulated material therefrom and means for intermittently turning the carrier, means for guiding the cleaning member and for holding same in contact with the filtering surfaces, a driving shaft for the carrier, a second shaft driven thereby and connected to turn the carrier from said first shaft, a crank pin on said second shaft and link and lever mechanism operated by said crank pin for moving the cleaning member to and fro along the guide means and over the filtering surfaces between the intermittent turning impulses imparted to the carrier.

12. A rotary filter comprising a series of filter units carried by a shaft rotatable on a horizontal axis and having filtering surfaces arranged radially to the axis and longitudinally of said shaft, said units having interior filtrate passages connected to an outlet and being rotatable in a vessel containing the fluid under treatment, a movable cleaning device mounted on a guide for movement over the filtering surfaces to remove accumulated material therefrom, a shaft having a crank for operating said cleaning device, a Geneva motion disc geared to the filter unit shaft and an arm connected to be driven by the shaft carrying said crank and having a roller cooperating with the Geneva disc to turn the filter shaft intermittently therethrough.

In witness whereof we affix our signatures.

HENRY SELBY HELE-SHAW.
REGINALD COLLES BEAUFOY STILLMAN.
JOSEPH ALLEN PICKARD.